H. C. WAITE.
TRACTOR.
APPLICATION FILED AUG. 20, 1915.

1,235,400.

Patented July 31, 1917.

Witnesses:

Inventor:
Harry C. Waite,
By Dyrenforth, Lee, Chritton and Wiles
Attys.

UNITED STATES PATENT OFFICE.

HARRY C. WAITE, OF CHICAGO, ILLINOIS, ASSIGNOR, BY MESNE ASSIGNMENTS, TO ELGIN TRACTOR CORPORATION, A CORPORATION OF NEW YORK.

TRACTOR.

1,235,400.        Specification of Letters Patent.      Patented July 31, 1917.

Application filed August 20, 1915. Serial No. 46,571.

*To all whom it may concern:*

Be it known that I, HARRY C. WAITE, a citizen of the United States, residing at West Pullman, Chicago, in the county of Cook and State of Illinois, have invented a new and useful Improvement in Tractors, of which the following is a specification.

My invention relates to improvements in tractors, more particularly to that form of tractor in which an internal combustion engine forms the motive power. My object is to provide a means by which the exhaust gases of the internal combustion engine may operate to assist in cooling the said engine. Other objects and advantages of my invention will more fully appear from the following detailed description of a specific embodiment thereof. In this description reference will be had to the accompanying sheet of drawings, in which:—

Figure 1:
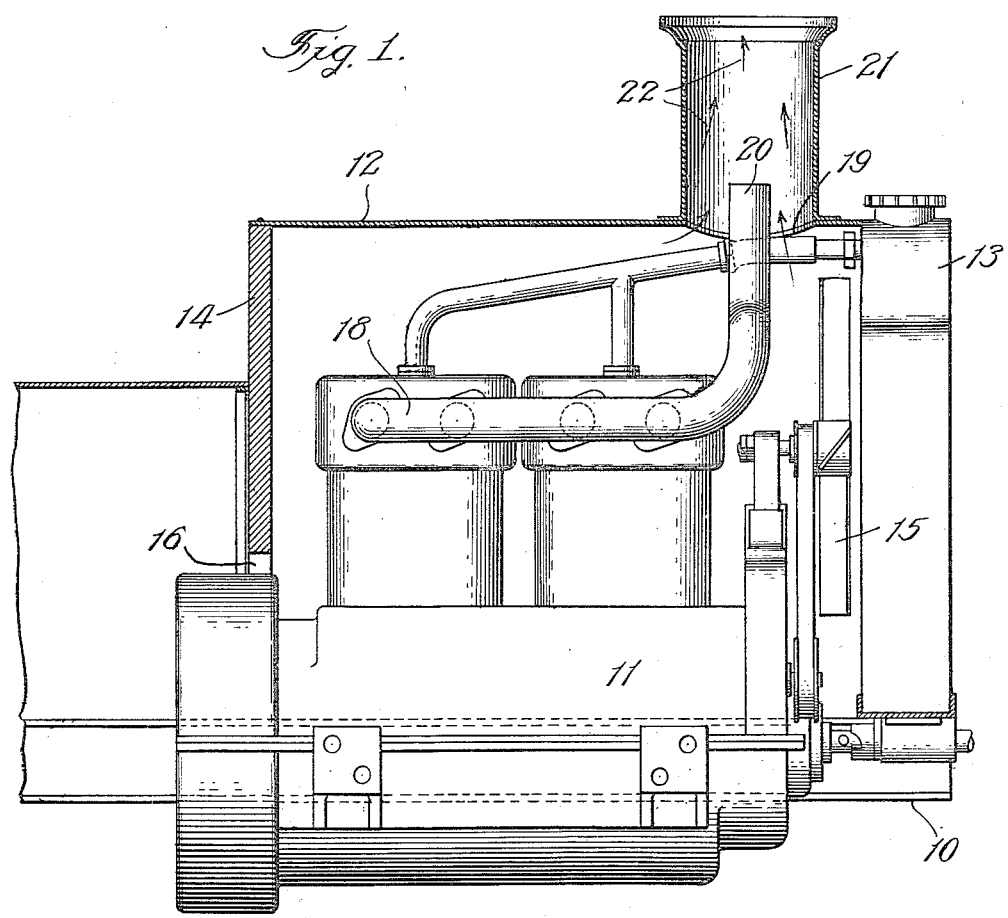
Figure 2:
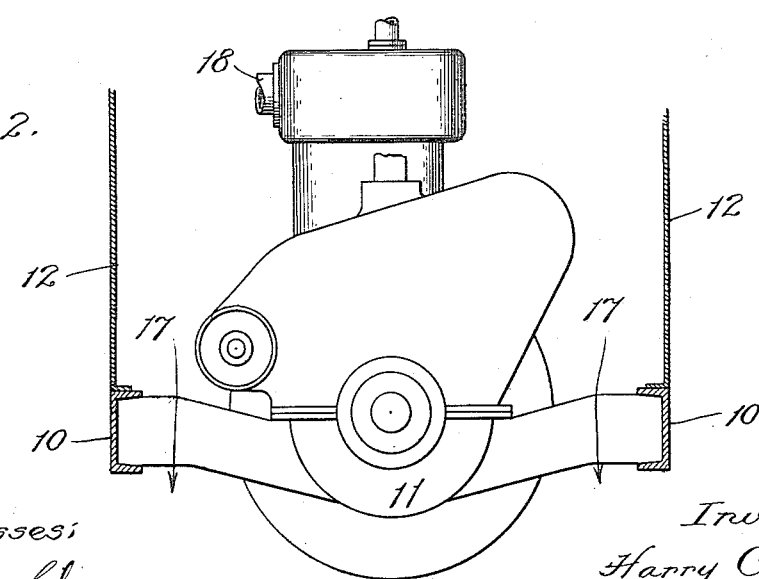

Figure 1 represents a longitudinal section through the front portion of the tractor body, the internal combustion engine and its radiator being shown in elevation; and Fig. 2 is a transverse section through the body taken on the line 2 of Fig. 1.

Referring more particularly to the drawing, the numeral 10 designates the chassis frame of the tractor, in which frame there is mounted an internal combustion engine generally designated by 11. In accordance with common practice this engine may be located longitudinally of the frame and in the front portion thereof and covered by a removable hood or bonnet 12, which is customarily formed of sheet metal and rests at its front end upon a radiator 13 and at its rear end upon a dashboard 14. The radiator 13 will commonly consist of a multiplicity of water passages or conduits which are designed to be cooled by an air current passing through the radiator in the direction of its depth and induced either by the movement of the vehicle through the air or by an engine-driven suction-fan, such as the fan 15 shown in Fig. 1, or by both of these forces.

According to common practice the air which passes through the radiator 13 escapes from the inclosed chamber in which the engine is mounted either through a space 16 at the bottom of the dashboard 14 or through the spaces between the crank-case of the engine and the chassis frame of the vehicle, as indicated by the arrow 17 in Fig. 2, or by both of these outlets. It will therefore be seen that the general movement of the air within the inclosure in which the engine is mounted is ordinarily through the radiator, over the internal combustion engine and thence outward in a downward or rearward direction. It will be understood that in passing through the radiator the air has imparted to it considerable heat, by reason of its intimate contact with the water passages thereof, and that in passing over the upper part of the engine in its rearward and downward course the air will be still further heated by radiation, conduction and convection from the highly heated cylinder heads and more especially from the exhaust pipe of the engine, which exhaust pipe, as shown at 18 in Fig. 1 of the drawings, is customarily mounted longitudinally of the upper end of the engine. This highly heated air is, according to common practice compelled to move rearwardly and downwardly, contrary to the force of gravity thereon, in order to escape from the chamber formed by the hood and the dashboard, and in such downward movement it passes over the lower ends or bases of the cylinders and crank-case, and tends to transfer to these parts the heat which was imparted to it by the radiator, the cylinder heads, and the exhaust pipe.

It is my particular object to rectify this condition by providing a natural or gravity air circulation within the inclosed space in which the engine is mounted, and to further assist this circulation by an ejector action of the exhaust gases. In order to accomplish this result I form an opening 19 in the upper portion of the hood or bonnet 12 and into this opening I project the end 20 of the exhaust pipe 18, the pipe being suitably curved for this purpose. Over the opening 19 I prefer to mount a stack, funnel or outlet tube 21.

With the parts arranged in the manner described it will be seen that a natural or gravity air circulation will be set up, the cool air entering at the bottom or at the rear or both, becoming gradually heated as it passes upwardly over the walls of the engine, and the hot air eventually passing outward through the aperture 19 and stack 21. The air entering through the radiator 13 will pursue a similar course, passing backward through the fan and outward through the upper opening 19, as indicated by the arrows 22. This gravity circulation of air may be assisted by the ejector action of the gas stream issuing from the end 20 of the exhaust pipe, the action being more or less automatically regulated in that the gases will increase proportionately to the power developed and the heat liberated by the engine.

The advantages resultant upon my construction may be said to be primarily a better cooling of the radiator and more especially a greatly reduced temperature of the lower portion of the engine, that is the crank-case and its connecting parts including, according to ordinary construction, the oil reservoir and oil-splash pits. This latter result is of especial importance in that by maintaining the oil at a moderate temperature its viscosity is kept lower and its lubricating efficiency thereby increased with a resultant decrease in friction and wear.

I have illustrated and described a specific embodiment of my invention as applied to gasolene-driven tractors for the reason that my invention is peculiarly advantageous in this service, by reason of the fact that tractor engines customarily operate under a greater proportion of their maximum load capacity and therefore under more arduous temperature conditions than do ordinary motor vehicles. It is to be understood, however, that my invention is applicable to all forms of motor vehicles, and to motor boats and to stationary power plants, in which the internal combustion engine is mounted within an inclosed chamber and where it is desirable that an air circulation over the engine be set up. It will also be understood that although I have not illustrated a muffler or exhaust silencer in connection with my exhaust pipe, the provision of such a device is entirely optional and does not affect the principles of my invention.

While I have particularly described and illustrated one specific embodiment of my invention, it will be understood that such showing and description is illustrative only and for the purpose of making the invention more clear, and that I do not regard the same as limited to such details of arrangement or construction, except in so far as such limitations have been included within the terms of the following claims in which it is my intention to claim all novelty inherent in my invention, as broadly as is possible in view of the prior art.

What I claim is:

1. In combination with an internal combustion engine of a hood incasing the upper portion of the said engine, means for admitting air adjacent the lower portion of the said engine, and a stack carried by the top of the said hood, whereby a gravity air circulation over the said engine is set up.

2. In combination an internal combustion engine, a hood incasing the upper portion of the said engine and provided with an aperture, and an exhaust pipe connected with the said engine and having its discharge end projected into the said aperture.

3. In combination an internal combustion engine, a hood incasing the upper portion of the said engine, means for admitting air adjacent the lower portion of the said engine, a stack carried by the top of the said hood, and an exhaust pipe connected with the said engine and having its discharge end projected into the said stack.

4. In a motor vehicle and in combination a chassis frame, a radiator mounted transversely of one end of the said frame, a dashboard mounted transversely of the frame and spaced away from the said radiator, an internal combustion engine lying longitudinally of the frame and between the said radiator and dashboard, a hood incasing the upper portion of the said engine and extending between the radiator and the dashboard, a stack carried by the top of the said hood, and an exhaust pipe connected with the said engine and having its discharge end projected into the said stack.

In testimony whereof I have hereunto set my hand this 31st day of July, 1915.

HARRY C. WAITE.

In presence of two subscribing witnesses:
O. C. Avisus;
A. C. Fischer.